US009706758B1

(12) United States Patent
Barnes, III

(10) Patent No.: US 9,706,758 B1
(45) Date of Patent: Jul. 18, 2017

(54) REPTILE LIGHTING ASSEMBLY FOR UVB AND BASKING REQUIREMENTS

(71) Applicant: G. Thomas Barnes, III, Charlotte, NC (US)

(72) Inventor: G. Thomas Barnes, III, Charlotte, NC (US)

( * ) Notice: Subject to any disclaimer, the term of this patent is extended or adjusted under 35 U.S.C. 154(b) by 338 days.

(21) Appl. No.: 14/612,592

(22) Filed: Feb. 3, 2015

Related U.S. Application Data

(60) Provisional application No. 61/942,502, filed on Feb. 20, 2014.

(51) Int. Cl.
*A01K 63/06* (2006.01)
*A01K 63/00* (2017.01)

(52) U.S. Cl.
CPC ............ *A01K 63/06* (2013.01); *A01K 63/006* (2013.01)

(58) Field of Classification Search
CPC .............................. A01K 63/06; A01K 63/006
USPC ............. 362/217.01, 228, 231; 119/266, 267
See application file for complete search history.

(56) References Cited

U.S. PATENT DOCUMENTS

| 2,753,444 | A | 7/1956 | Zurawski |
| 2,951,148 | A | 8/1960 | Stahlhut |
| 3,065,343 | A | 11/1962 | Zurawski |
| 4,078,169 | A | 3/1978 | Armstrong |
| 5,479,327 | A * | 12/1995 | Chen ......................... F21S 8/00 362/218 |
| 8,322,011 | B2 | 12/2012 | Hargreaves |
| 2006/0243214 | A1 | 11/2006 | Van Heygen |
| 2008/0316732 | A1* | 12/2008 | Blake ...................... A01K 63/06 362/101 |
| 2010/0039804 | A1* | 2/2010 | Budde ..................... A01G 7/045 362/231 |
| 2013/0063963 | A1* | 3/2013 | Riesebosch ............. F21V 21/34 362/555 |
| 2013/0193857 | A1* | 8/2013 | Tlachac ................. H05B 37/02 315/153 |

* cited by examiner

Primary Examiner — Laura Tso
(74) Attorney, Agent, or Firm — Kyle A. Fletcher, Esq.

(57) ABSTRACT

The reptile lighting assembly for UVB and basking requirements is a device that is adapted to attach onto a UVB light subsassembly, and is also able to plug into an existing wiring system associated with said UVB light subassembly. The reptile lighting assembly includes an elongated bracket that is adapted to clip onto the UVB light subassembly. The elongated bracket includes at least one clip member that is adapted to clip onto opposing surfaces of the UVB light subassembly. The elongated bracket includes a basking light socket on a distal end of a first surface of the elongated bracket. A basking lamp is able to plug into the basking light socket, and is able to direct a different type of light than compared to the UVB light subassembly.

17 Claims, 6 Drawing Sheets

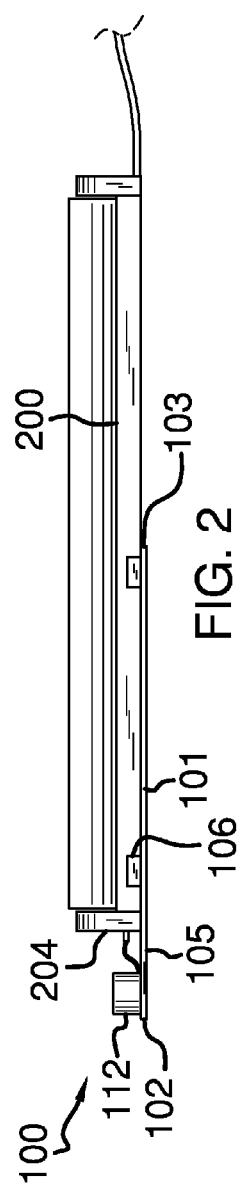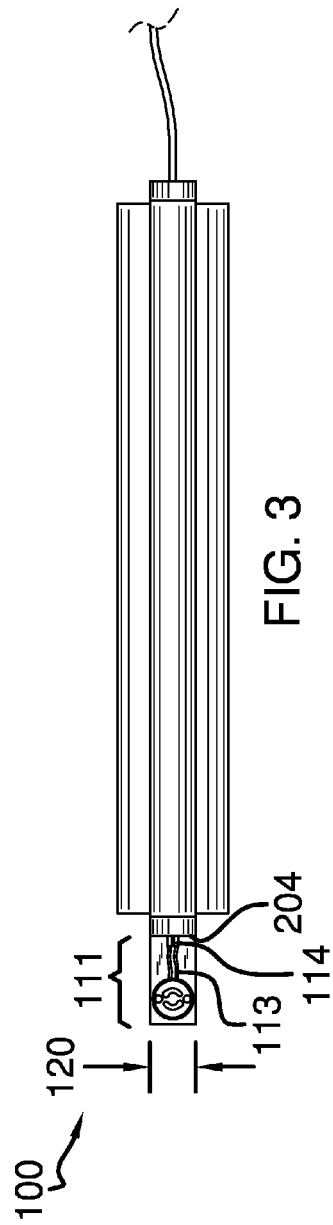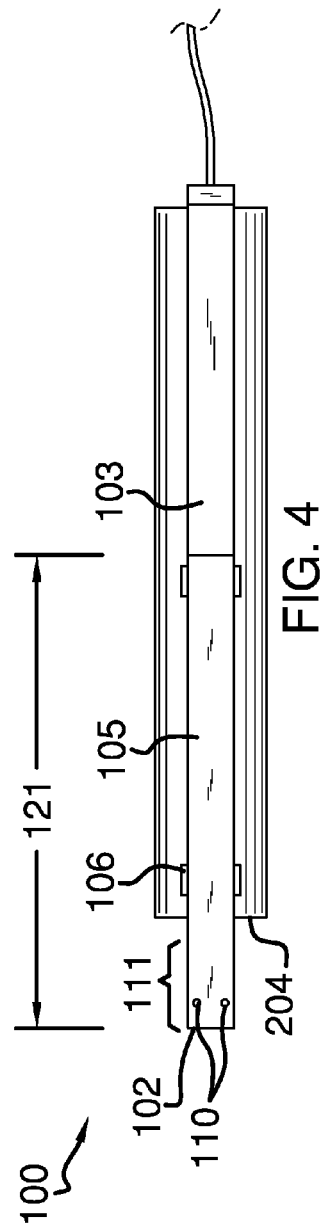

REPTILE LIGHTING ASSEMBLY FOR UVB AND BASKING REQUIREMENTS

CROSS REFERENCES TO RELATED APPLICATIONS

This non-provisional patent application claims priority to a provisional patent application 61/942,502 that was filed on Feb. 20, 2014.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of lighting accessories, more specifically, a device that is adapted to secure onto an existing UVB light subassembly, and direct additional light onto a reptile habitat.

Summary of Invention

The reptile lighting assembly for UVB and basking requirements is a device that is adapted to attach onto a UVB light subsassembly, and is also able to plug into an existing wiring system associated with said UVB light subassembly. The reptile lighting assembly includes an elongated bracket that is adapted to clip onto the UVB light subassembly. The elongated bracket includes at least one clip member that is adapted to clip onto opposing surfaces of the UVB light subassembly. The elongated bracket includes a basking light socket on a distal end of a first surface of the elongated bracket. A basking lamp is able to plug into the basking light socket, and is able to direct a different type of light than compared to the UVB light subassembly. The basking lamp socket includes a pair of wires that extend from the basking lamp socket, and are adapted to plug into a UVB light subassembly port. The UVB light subassembly port is located on a distal end of the UVB light subassembly.

These together with additional objects, features and advantages of the reptile lighting assembly for UVB and basking requirements will be readily apparent to those of ordinary skill in the art upon reading the following detailed description of the presently preferred, but nonetheless illustrative, embodiments when taken in conjunction with the accompanying drawings.

In this respect, before explaining the current embodiments of the reptile lighting assembly for UVB and basking requirements in detail, it is to be understood that the reptile lighting assembly for UVB and basking requirements is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the reptile lighting assembly for UVB and basking requirements.

It is therefore important that the claims be regarded as including such equivalent construction insofar as they do not depart from the spirit and scope of the reptile lighting assembly for UVB and basking requirements. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 2 is a side view of an embodiment of the disclosure.

FIG. 3 is a top view of an embodiment of the disclosure.

FIG. 4 is a bottom view of an embodiment of the disclosure.

DETAILED DESCRIPTION OF THE EMBODIMENT

Figure 1:
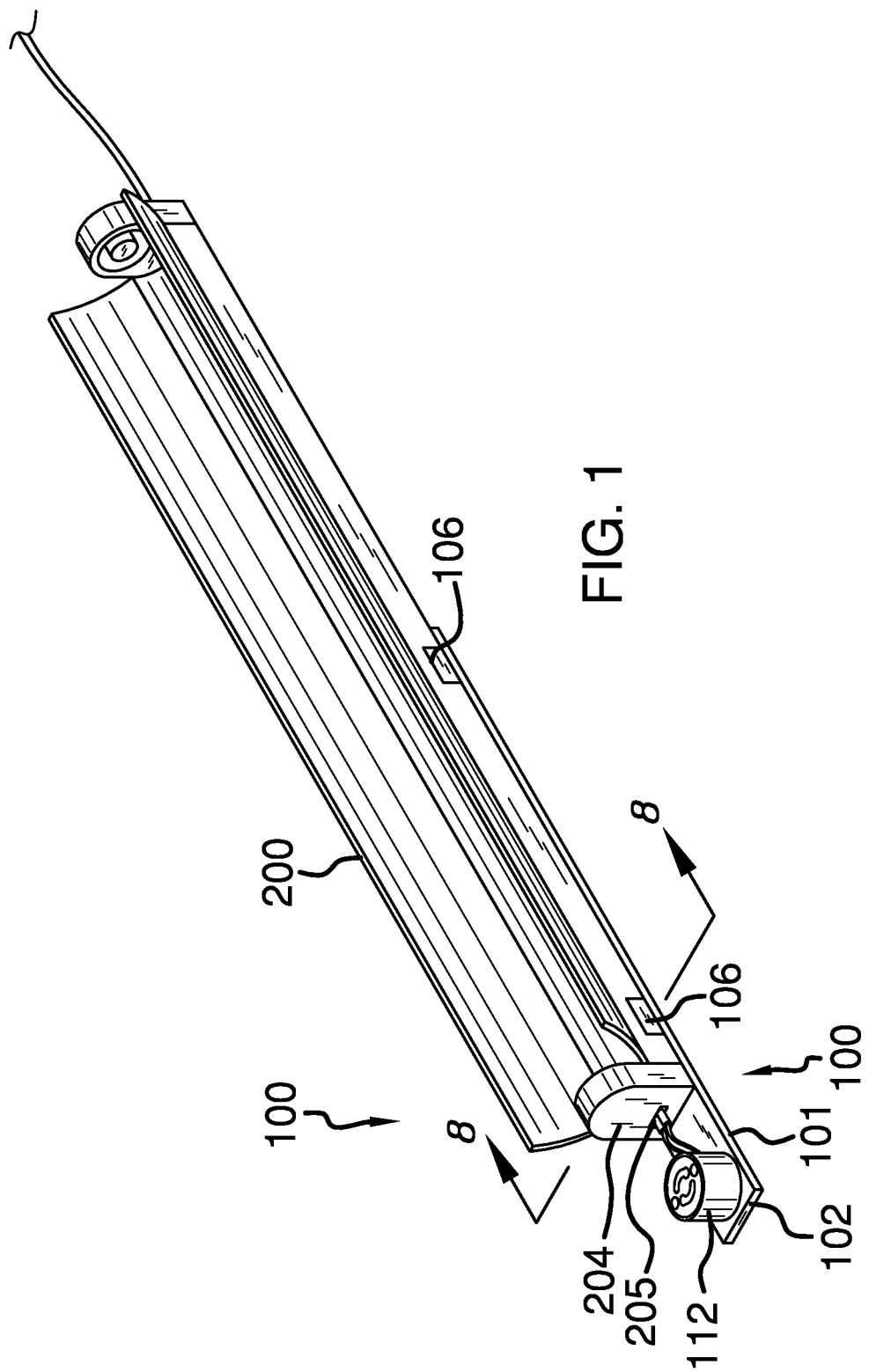
FIG. 1 is a perspective view of an embodiment of the disclosure.
Figure 5:
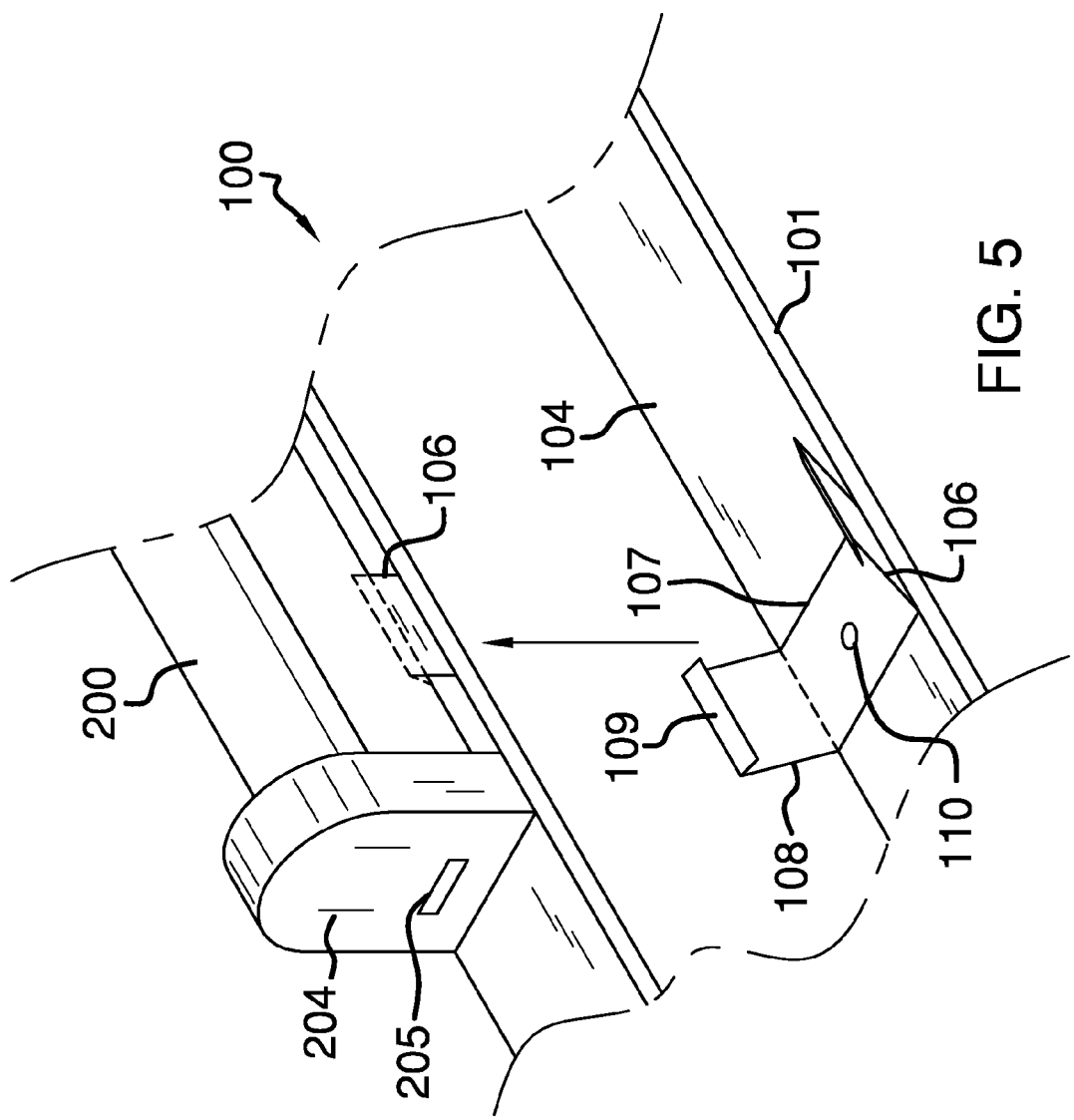
FIG. 5 is a detailed exploded view of an embodiment of the disclosure adjacent a UVB subassembly.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 8. The reptile lighting assembly for UVB and basking requirements 100 (hereinafter invention) comprises an elongated bracket 101 that is adapted to attach onto a UVB light subassembly 200. Moreover, the elongated bracket 101 is further defined with a first distal end 102, a second distal end 103, a first surface 104, and a second surface 105.

The elongated bracket 101 is a thin strip of material, which may be made of a material comprising a metal, plastic, carbon fiber composite. The elongated bracket 101 is further defined with a bracket width 120, which is not less than 0.25 inches, and not greater than 2 inches. The elongated bracket 101 is further defined with a bracket length 121. The bracket length 121 is not less than 4 inches.

The elongated bracket 101 includes at least one clip 106 attached thereto. The at least one clip 106 is responsible for securing the elongated bracket 101 against the UVB light subassembly 200. Moreover, the first surface 104 is adjacent to the UVB light subassembly 200. The UVB light subassembly 200 is further defined with a side surface 201 as well as a UVB base member 202. The UVB base member 202 extends upwardly and forms a recess 203 between the side surface 201 and the UVB base member 202. The at least one clip 106 is adapted to clip onto the recess 203 in order to secure the invention 100 onto the UVB subassembly 200. Moreover, the at least one clip 106 is sandwiched between the UVB light subassembly 200 and the elongated bracket 101.

The at least one clip 106 is further defined with a first clip portion 107 that is affixed to the second surface 105 of the elongated bracket 101. The at least one clip 106 is further defined with a second clip portion 108 that extends upwardly to a third clip portion 109. The third clip portion 109 is acutely oriented with respect to the second clip portion 108. The third clip portion 109 extends into the recess 203 of the UVB light subassembly 200. The first clip portion 107 is permanently affixed to the second surface 105 of the elongated bracket 101 via a securing member 110. The securing member 110 may comprise a rivet, weld, bolt, etc. It shall be noted that the elongated bracket 101 and the at least one clip 106 may be formed out of a single piece construction thereby eliminating the needs of the securing member 110 all together. The first clip portion 107 is sandwiched between the first surface 104 of the elongated bracket 101 and a bottom UVB light subassembly surface 222 of the UVB light subassembly 200.

A fourth portion 111 of the elongated bracket 101 extends beyond a third distal end 204 of the UVB subassembly 200. That being said, the at least one clip 106 is used to secure the elongated bracket 101 against the UVB subassembly 200 whilst leaving the fourth portion 111 as an extension of the UVB subassembly 200. The fourth portion 111 of the elongated bracket 101 includes a basking light socket 112 on the first surface 104. The basking light socket 112 is secured to the elongated bracket 104 via another of the securing member 110.

It shall be noted that the elongated bracket 104 may feature a plurality of the basking light sockets 112 on the fourth portion 111 of the elongated bracket 101. Moreover, the invention 100 may feature at least one basking light socket 112 on the fourth portion 111 of the elongated bracket 101.

Figure 7:
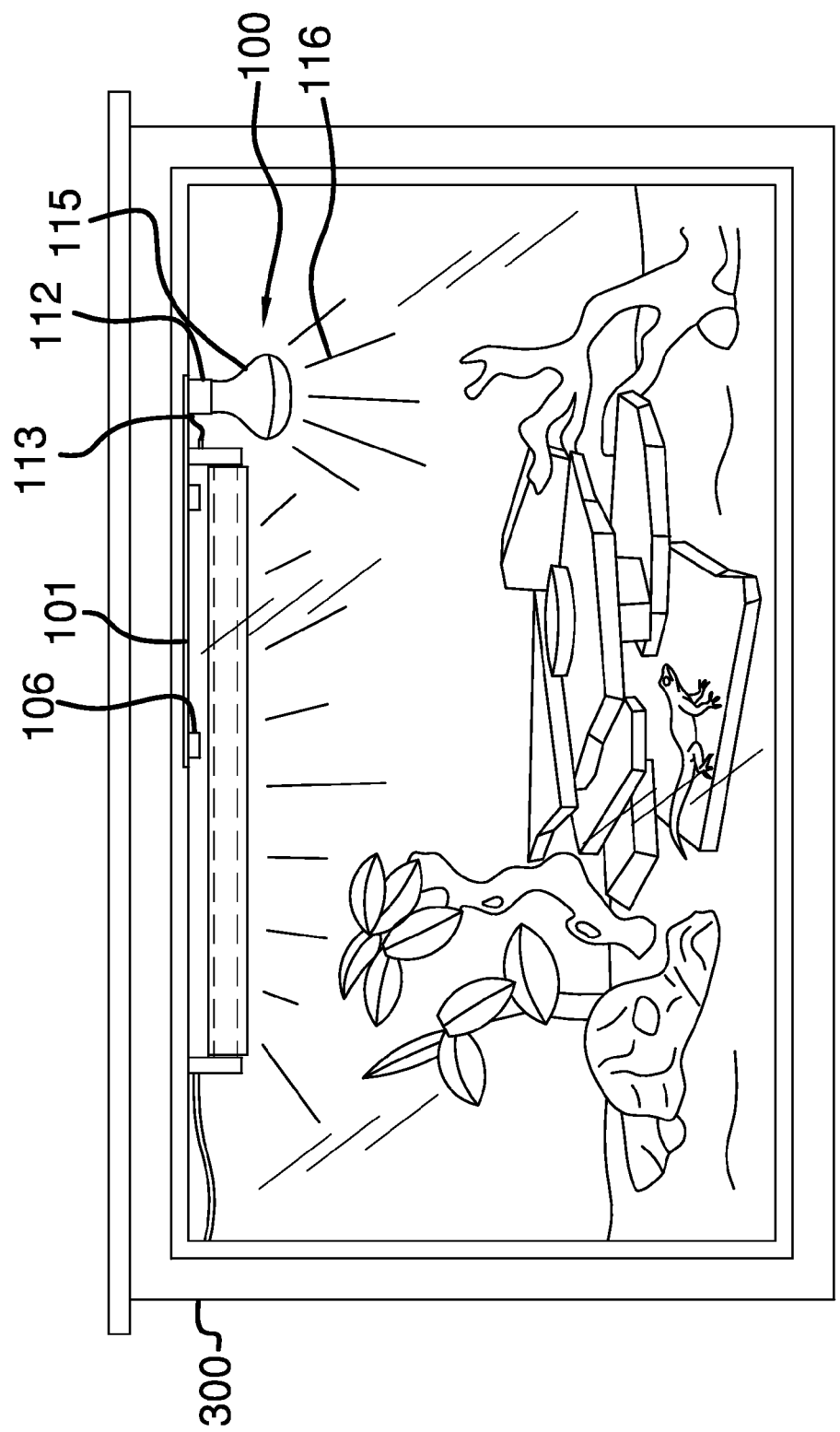
FIG. 7 is a view of an embodiment of the disclosure in use.
Figure 8:
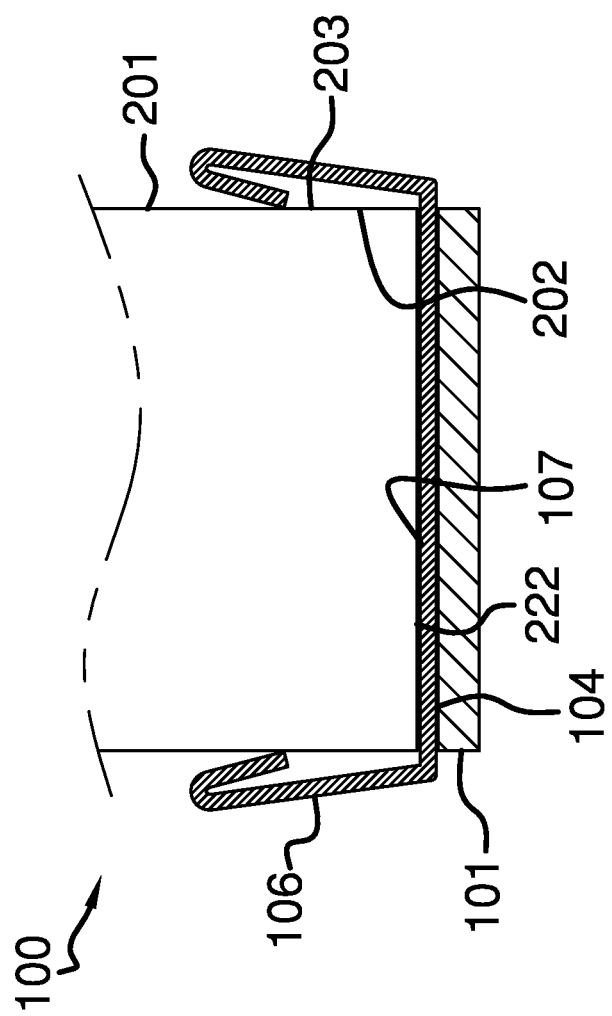
FIG. 8 is a cross-sectional view of an embodiment of the disclosure along line 8-8 in FIG. 1.

The basking light socket 112 includes a pair of wires 113 that extend to a basking light plug 114. The basking light plug 114 is adapted to connect with a UVB light port 205 located on the third distal end 204 of the UVB light subassembly 200. It shall be noted that the UVB light subassembly 200 typically includes the UVB light port 205 on the third distal end 204 as multiple UVB light subassemblies are able to be connected together. The basking light socket 112 enables a basking light 115 to be plugged therein, and provide basking light 116 in conjunction with the UVB light subassembly 200. It shall be noted that the wattage or voltage of the basking light 115 varies depending on the needs or particulars of the UVB light subassembly 200. Referring to FIG. 7, the invention 100 is adapted to be used in conjunction with the UVB light subassembly 200, and with respect to an artificial reptile habitat 300.

Figure 6:
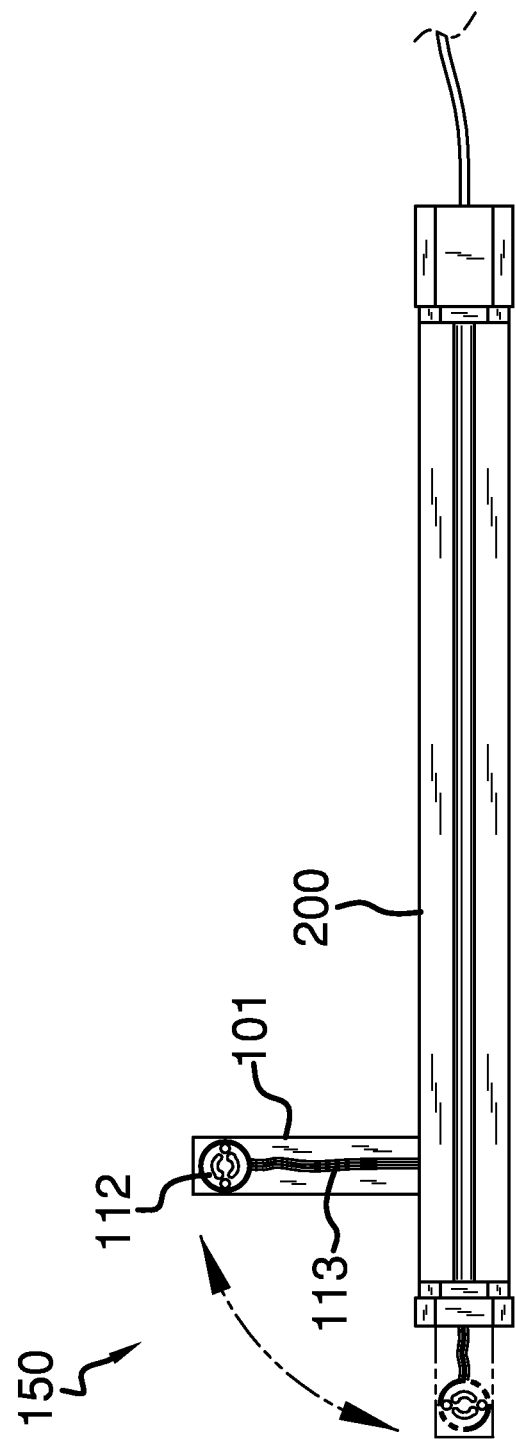
FIG. 6 is another top view of an alternative embodiment of the disclosure.

Referring to FIG. 6, an alternative embodiment 150 may enable the securing member 110 to be used in lieu of the at least one clip 106 in order to secure the elongated bracket 101 to the UVB light subassembly 200. Moreover, the use of the securing member 110 enables the elongated bracket 101 to rotate with respect to the UVB light subassembly 200 (as depicted in FIG. 6).

With respect to the above description, it is to be realized that the optimum dimensional relationship for the various components of the invention described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A basking light configured for use with a UVB light subassembly, and for use with an artificial reptile habitat comprising:

an elongated bracket that is configured to attach onto the UVB light subassembly;

wherein a basking light socket is provided adjacent a first distal end of the elongated bracket;

wherein a basking light is attached to the basking light socket in order to provide basking light that is configured to be used in conjunction with light output of the UVB light subassembly;

wherein the elongated bracket is further defined with the first distal end, a second distal end, a first surface, and a second surface;

wherein the elongated bracket is a thin strip of material;

wherein the elongated bracket is further defined with a bracket width, which is not less than 0.25 inches, and not greater than 2 inches;

wherein the elongated bracket is further defined with a bracket length, which is not less than 4 inches;

wherein the elongated bracket includes at least one clip attached thereto;

wherein the at least one clip is responsible for securing the elongated bracket against the UVB light subassembly.

2. The reptile lighting assembly for UVB and basking requirements according to claim 1 wherein the first surface is adjacent to the UVB light subassembly; wherein the UVB light subassembly is further defined with a side surface as well as a UVB base member; wherein the UVB base member extends upwardly and forms a recess between the side surface and the UVB base member.

3. The reptile lighting assembly for UVB and basking requirements according to claim 2 wherein the at least one clip is adapted to clip onto the recess in order to secure the elongated clip onto the UVB subassembly.

4. The reptile lighting assembly for UVB and basking requirements according to claim 3 wherein the at least one clip is further defined with a first clip portion that is affixed to the second surface of the elongated bracket.

5. The reptile lighting assembly for UVB and basking requirements according to claim 4 wherein the at least one clip is further defined with a second clip portion that extends upwardly to a third clip portion; wherein the third clip portion is acutely oriented with respect to the second clip portion.

6. The reptile lighting assembly for UVB and basking requirements according to claim 5 wherein the third clip portion extends into the recess of the UVB light subassembly.

7. The reptile lighting assembly for UVB and basking requirements according to claim 6 wherein the first clip portion is permanently affixed to the second surface of the elongated bracket via a securing member or both the at least one clip and elongated bracket are constructed of a single-piece construction; wherein the securing member comprises a rivet, weld, bolt.

8. The reptile lighting assembly for UVB and basking requirements according to claim 7 wherein the first clip portion is sandwiched between the first surface of the elongated bracket and a bottom UVB light subassembly surface of the UVB light subassembly.

9. The reptile lighting assembly for UVB and basking requirements according to claim 8 wherein a fourth portion of the elongated bracket extends beyond a third distal end of the UVB subassembly; wherein the at least one clip is used to secure the elongated bracket against the UVB subassembly whilst leaving the fourth portion as an extension of the UVB subassembly.

10. The reptile lighting assembly for UVB and basking requirements according to claim 9 wherein the fourth portion of the elongated bracket includes the basking light socket on the first surface; wherein the basking light socket is secured to the elongated bracket via another of the securing member.

11. The reptile lighting assembly for UVB and basking requirements according to claim 10 wherein the basking light socket includes a pair of wires that extend to a basking light plug.

12. The reptile lighting assembly for UVB and basking requirements according to claim 11 wherein the basking light plug is adapted to connect with a UVB light port located on the third distal end of the UVB light subassembly.

13. A basking light configured for use with a UVB light subassembly comprising:
   an elongated bracket that is configured to attach onto the UVB light subassembly;
   wherein at least one basking light socket is provided adjacent a first distal end of the elongated bracket;
   wherein a basking light is attached to the at least one basking light socket in order to provide basking light that is configured to be used in conjunction with light output of the UVB light subassembly;
   wherein the elongated bracket is further defined with the first distal end, a second distal end, a first surface, and a second surface;
   wherein the elongated bracket includes at least one clip attached thereto; wherein the at least one clip is responsible for securing the elongated bracket against the UVB light subassembly.

14. The basking light adapted for use with a UVB light subassembly according to claim 13 wherein the elongated bracket is a thin strip of material; wherein the elongated bracket is further defined with a bracket width, which is not less than 0.25 inches, and not greater than 2 inches; wherein the elongated bracket is further defined with a bracket length, which is not less than 4 inches.

15. The basking light adapted for use with a UVB light subassembly according to claim 14 wherein the first surface is adjacent to the UVB light subassembly; wherein the UVB light subassembly is further defined with a side surface as well as a UVB base member; wherein the UVB base member extends upwardly and forms a recess between the side surface and the UVB base member; wherein the at least one clip is adapted to clip onto the recess in order to secure the elongated clip onto the UVB subassembly.

16. The basking light adapted for use with a UVB light subassembly according to claim 15 wherein the at least one clip is further defined with a first clip portion that is affixed to the second surface of the elongated bracket; wherein the at least one clip is further defined with a second clip portion that extends upwardly to a third clip portion; wherein the third clip portion is acutely oriented with respect to the second clip portion; wherein the third clip portion extends into the recess of the UVB light subassembly; wherein the first clip portion is permanently affixed to the second surface of the elongated bracket via a securing member or both the at least one clip and elongated bracket are constructed of a single-piece construction; wherein the securing member comprises a rivet, weld, bolt.

17. The basking light adapted for use with a UVB light subassembly according to claim 16 wherein the first clip portion is sandwiched between the first surface of the elongated bracket and a bottom UVB light subassembly surface of the UVB light subassembly; wherein a fourth portion of the elongated bracket extends beyond a third distal end of the UVB subassembly; wherein the at least one clip is used to secure the elongated bracket against the UVB subassembly whilst leaving the fourth portion as an extension of the UVB subassembly; wherein the fourth portion of the elongated bracket includes the at least one basking light socket on the first surface; wherein the at least one basking light socket is secured to the elongated bracket via another of the securing member; wherein the at least one basking light socket includes a pair of wires that extend to a basking light plug; wherein the basking light plug is adapted to connect with a UVB light port located on the third distal end of the UVB light subassembly.

* * * * *